(No Model.)
S. B. MINNICH.
COMPENSATING BIT HOLDER.
No. 460,922. Patented Oct. 6, 1891.
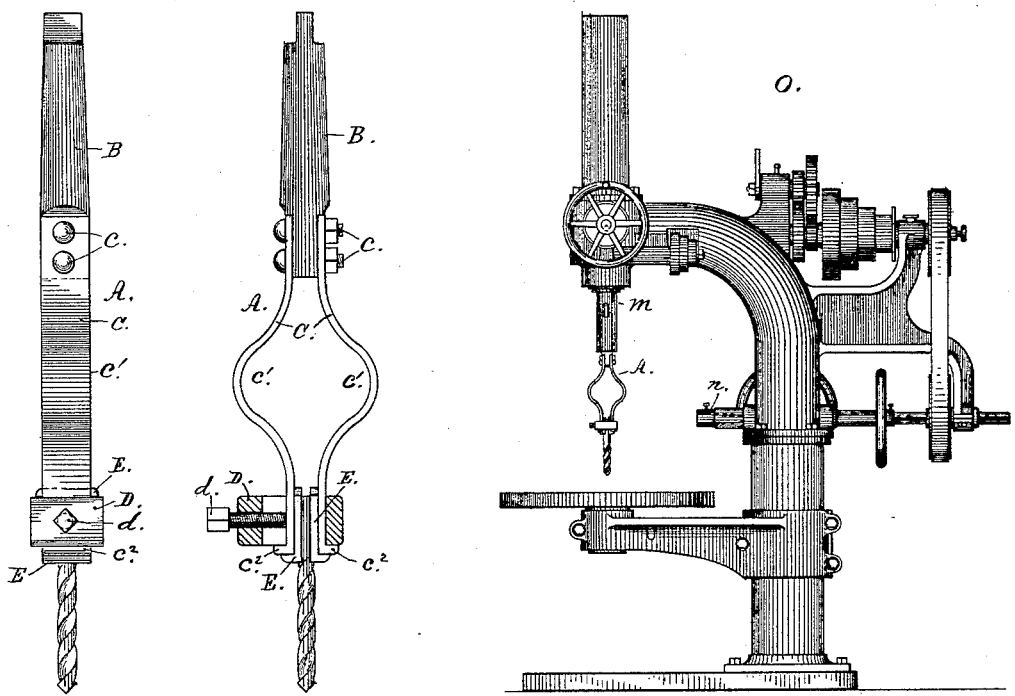
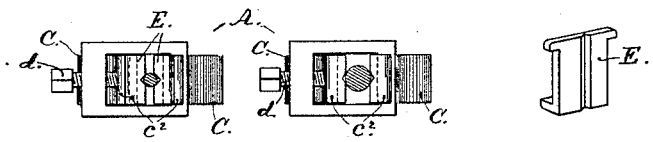
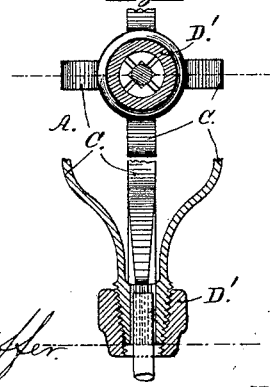
Witnesses:
Howard S. Stauffer
Gottfried S. Neff
Inventor
Simon B. Minnich.
By Daniel H. Herr.
Attorney.

UNITED STATES PATENT OFFICE.

SIMON B. MINNICH, OF LANDISVILLE, PENNSYLVANIA, ASSIGNOR TO MARY C. MINNICH, OF SAME PLACE.

COMPENSATING BIT-HOLDER.

SPECIFICATION forming part of Letters Patent No. 460,922, dated October 6, 1891.

Application filed February 6, 1891. Serial No. 380,536. (No model.)

*To all whom it may concern:*

Be it known that I, SIMON B. MINNICH, of Landisville, in the county of Lancaster and State of Pennsylvania, have invented certain new and useful Improvements in a Compensating Drill-Chuck or Bit-Holder; and I do hereby declare the following to be a full, clear, and exact description of the invention, such as will enable others skilled in the art to which it appertains to make and use the same.

My invention relates to improvements in a compensating chuck or drill holder of that class in which a number of flexible arms, straps, or wings have one end rigidly secured to the forward end of a shaft or mandrel adapted to be pushed into the usual socket formed about the axis of the spindle of the ordinary lathe or drill-press and the other ends of said arms adapted to engage the shank of a drill and to be compressed by a clamp and set-screw or any other suitable means to hold the drill in place.

The object of the invention is to provide a drill-chuck or bit-holder that will compensate for the irregularities in the pressure of the usual feeding devices of lathes and drill-presses and the unevenness in density of the particles composing the bodies being drilled or bored, both of which are now so very destructive to the points or cutting-ends of the drills or bits in use, breaking or blunting or otherwise unfitting them to do good work.

The purposes of the invention are attained by the means and devices illustrated in the accompanying drawings, in which similar letters of reference designate like parts throughout the several views.

Figure 1 is a side elevation of a power drill-press having two spindles, showing the elements of my invention in place in the lower end of the vertical spindle; Fig. 2, an enlarged side elevation of the chuck or drill holder, detached from Fig. 1, the clamp appearing in central vertical section; Fig. 3, a view from the left of Fig. 2, the clamp being completed; Fig. 4, a view from below of Fig. 2 the drill appearing in cross-section; Fig. 5, a similar view as in Fig. 4, but the liners removed and a larger drill in cross-section in place; Fig. 6, a perspective view of a liner used in pairs to hold smaller drills; and Fig. 7 two sectional views, each through the dotted line in the other, of a portion of a modification of my invention having four flexible arms, and a tapering socket clamp-screw instead of the clamp and set-screw, to compress the arms to hold the drill.

Reference being had to Fig. 1, O designates a drill-press having a vertical spindle $m$ and a horizontal spindle $n$, while A represents the chuck or drill-holder applied, in this instance, to the vertical spindle $m$; but it is equally applicable to the horizontal spindle $n$.

Referring to Figs. 2, 3, and 4, the device A consists of a shaft B, fitted closely into the socket of the spindle $m$ of the drill-press O; and to the lower end of the shaft B are rigidly secured the upper ends of straps or arms C, by means of rivets or bolts and nuts $c$. These straps or arms C are made of properly-tempered spring metal and may have any desired shape in cross-section. They have each an outwardly-projecting curve or loop $c'$ and at the lower extremity an angular lip $c^2$, and along the center line of the inner face a vertical V-shaped channel to engage the shank of the drill, Fig. 5. Embracing the lower ends of the arms and resting on the lips $c^2$ is a clamp D, through an end of which is tapped a set-screw $d$ to compress the arms and to hold the drill in place. A liner E (shown in perspective in Fig. 6) is placed in pairs between the arms, as is plainly shown in Figs. 2 and 3, when it is desired to use drills having small diameters. In this instance two arms are shown as attached to the shaft B; but this number may be increased, if desired, and instead of the clamp and set-screws before described a tapering socket clamp-screw D' may be used to compress the lower ends of the arms to hold the drill, as is clearly shown in the two views in Fig. 7.

An inspection of Fig. 1 in the drawings will clearly show that should there be any excessive pressure on the drill from the downward force of the feed the flexibility of the arms, by reason of the elasticity given them by the loops $c'$, will instantly relieve the tool from said pressure, and should the cutting-edges of the drill come into sudden contact with some hard obstruction in the body being bored the flexibility of the arms, acting torsionally, will again relieve the tool. Hence it may be observed that my tool-holder is a compensating drill-chuck.

In the drawings, the arms C are shown as having the longitudinal center line of each lying entirely within a plane passing through the axis of the chuck; but I do not confine myself to this precise construction, for the curved portions of said arms may be given a spiral twist about said axis, when both their axial and torsional elasticity will be increased. This latter construction being so simple and apparent, its separate illustration is deemed unnecessary.

Having now described my invention and shown its application, what I do consider new, and desire to secure by Letters Patent is,—

The hereinbefore-described drill-holder, consisting of elastic arms provided at one end with means for attaching to a lathe or drill-press and at the other end with means to hold a drill, substantially as and for the purpose set forth.

In testimony whereof I have hereunto subscribed my name in the presence of two subscribing witnesses.

SIMON B. MINNICH.

Witnesses:
B. L. BRUBAKER,
P. ADAMS HERR.